Figure 2:
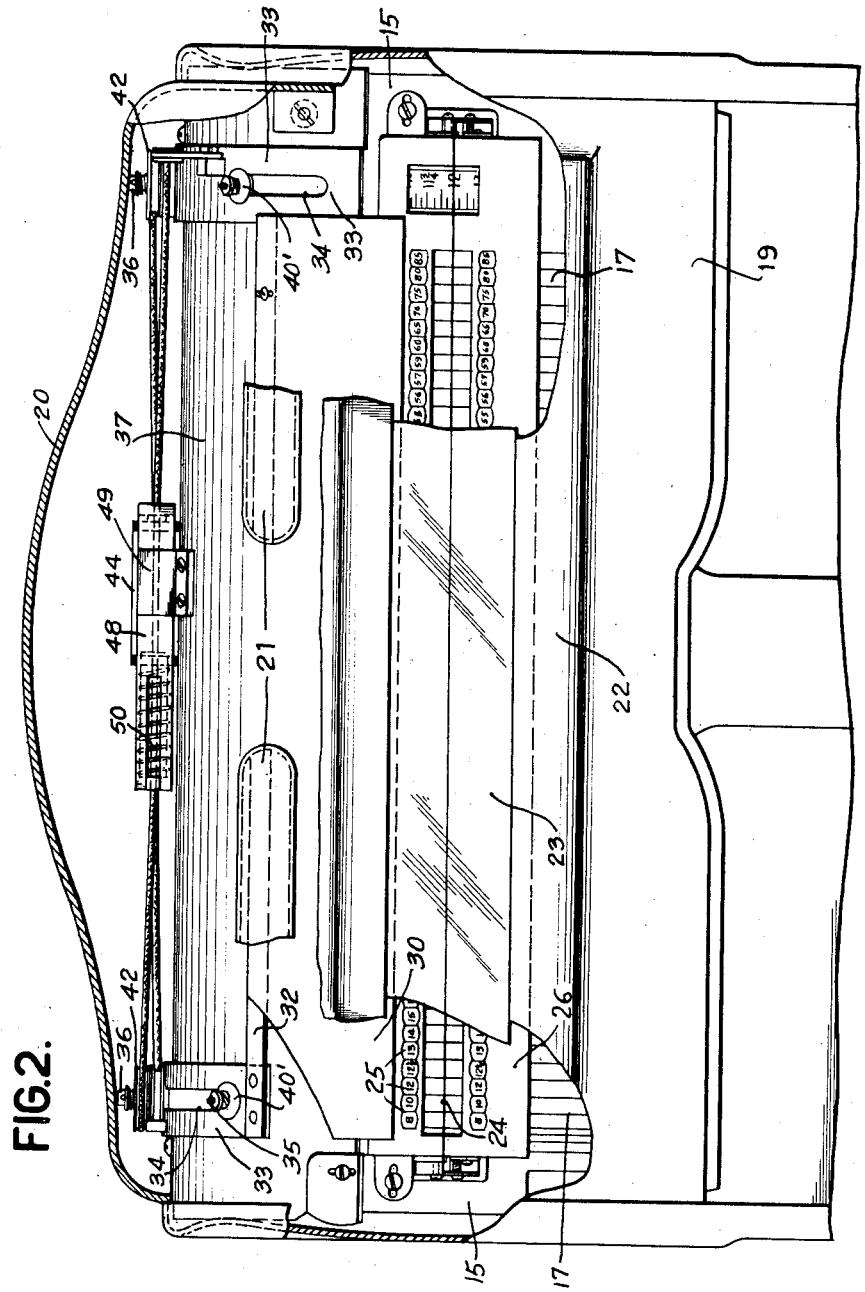

Jan. 8, 1935.  J. S. OGSBURY  1,987,308
SCALE
Filed May 6, 1933  5 Sheets-Sheet 1
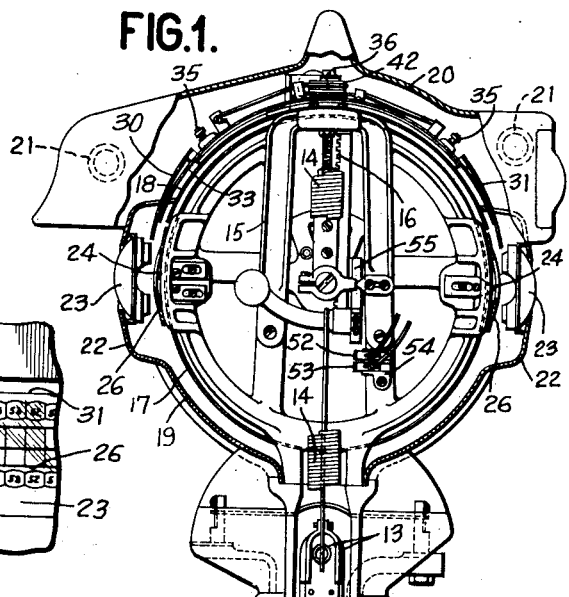
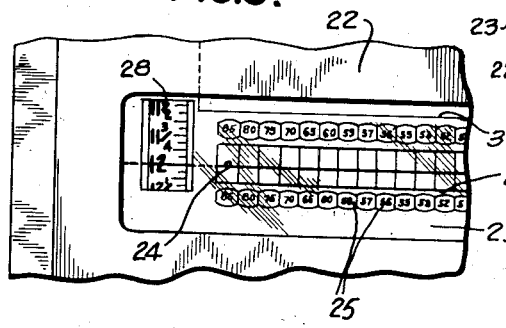
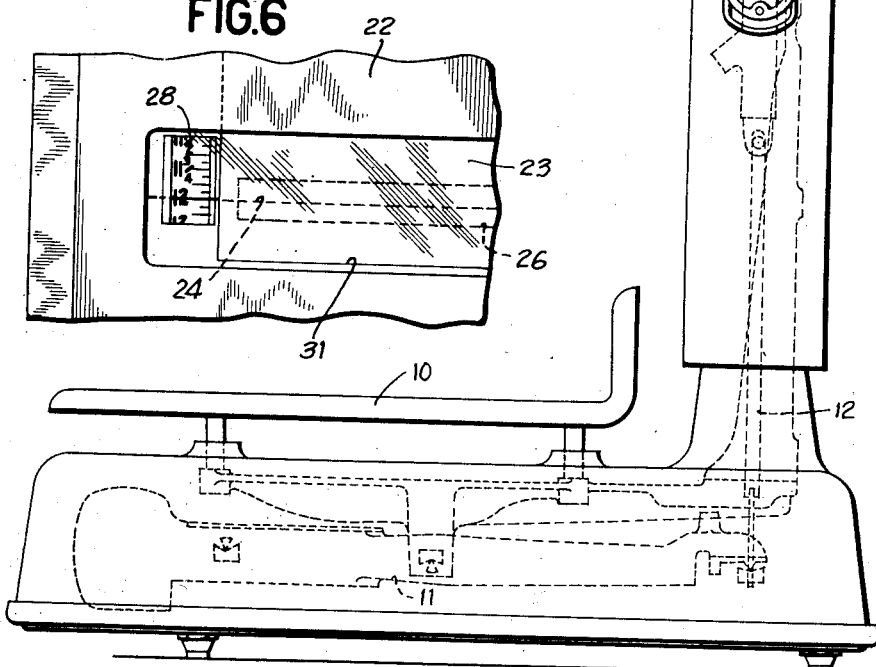
INVENTOR
James S. Ogsbury
BY
ATTORNEY Jan. 8, 1935. J. S. OGSBURY 1,987,308
SCALE
Filed May 6, 1933 5 Sheets-Sheet 2

INVENTOR
James S. Ogsbury
BY
W. M. Wilson
ATTORNEY

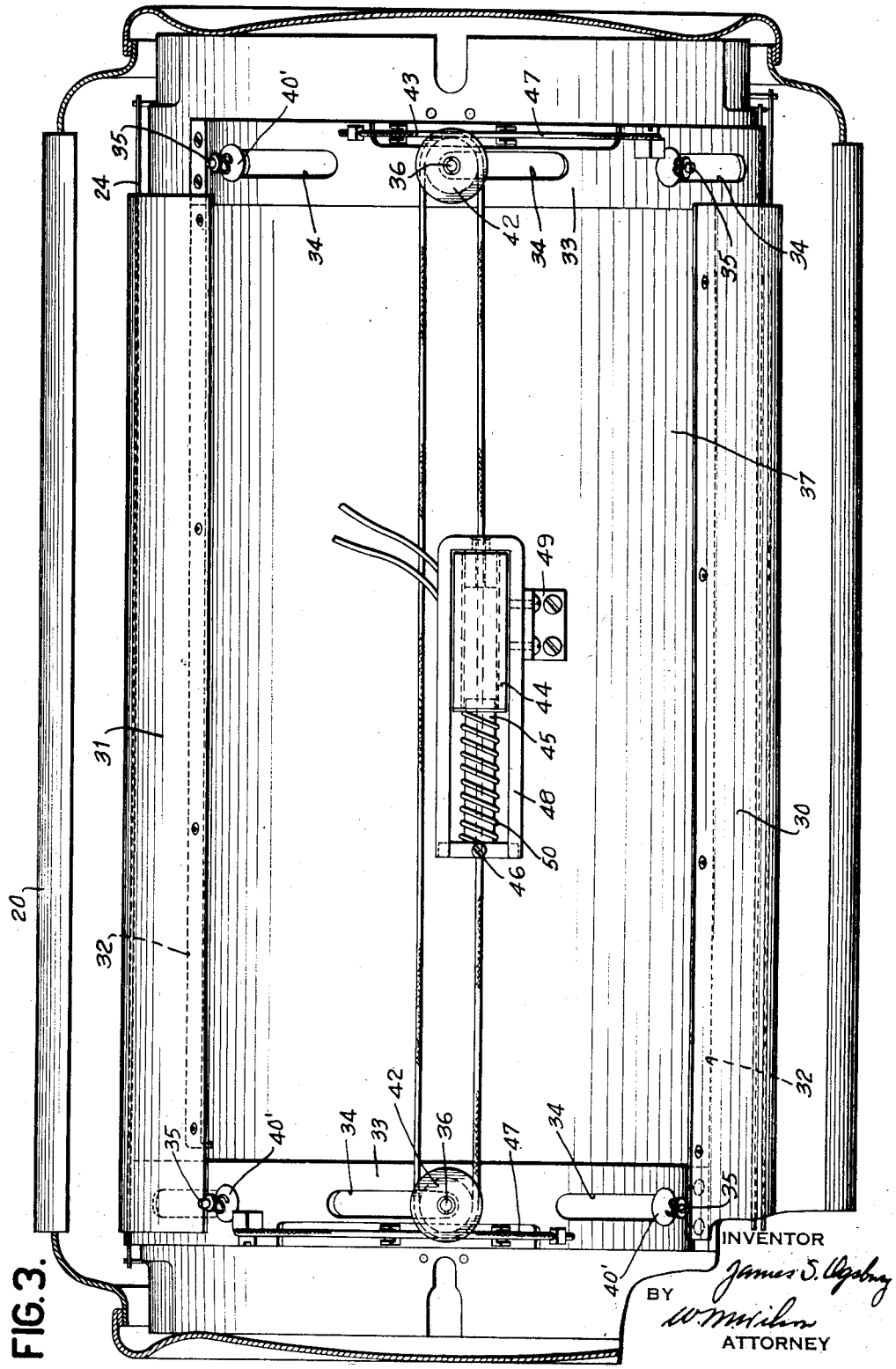

Jan. 8, 1935.  J. S. OGSBURY  1,987,308
SCALE
Filed May 6, 1933  5 Sheets-Sheet 4
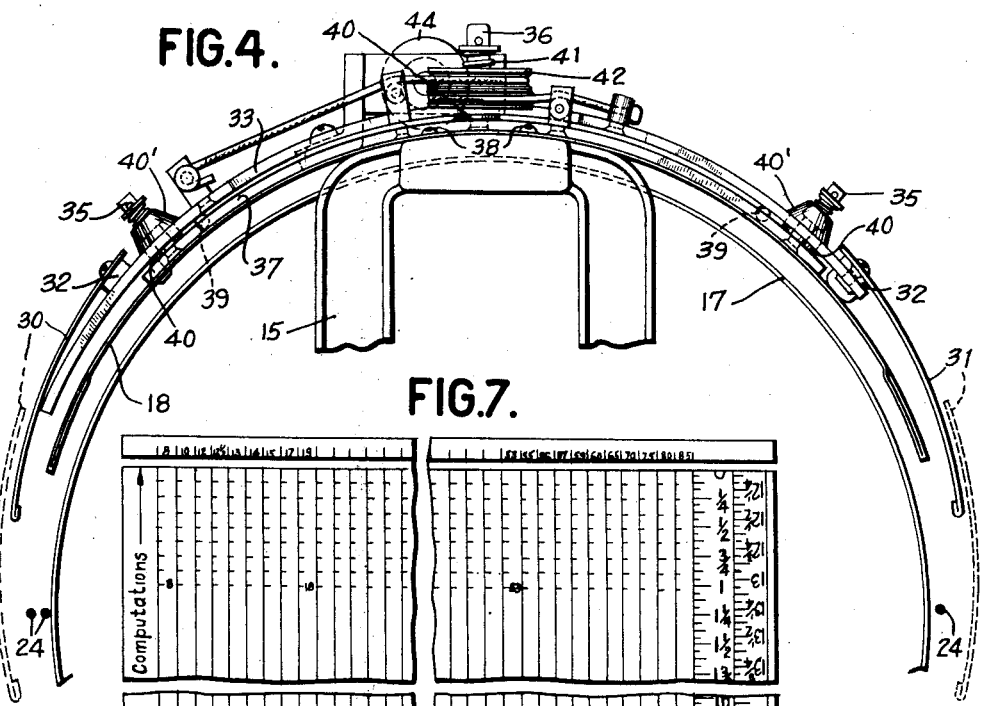
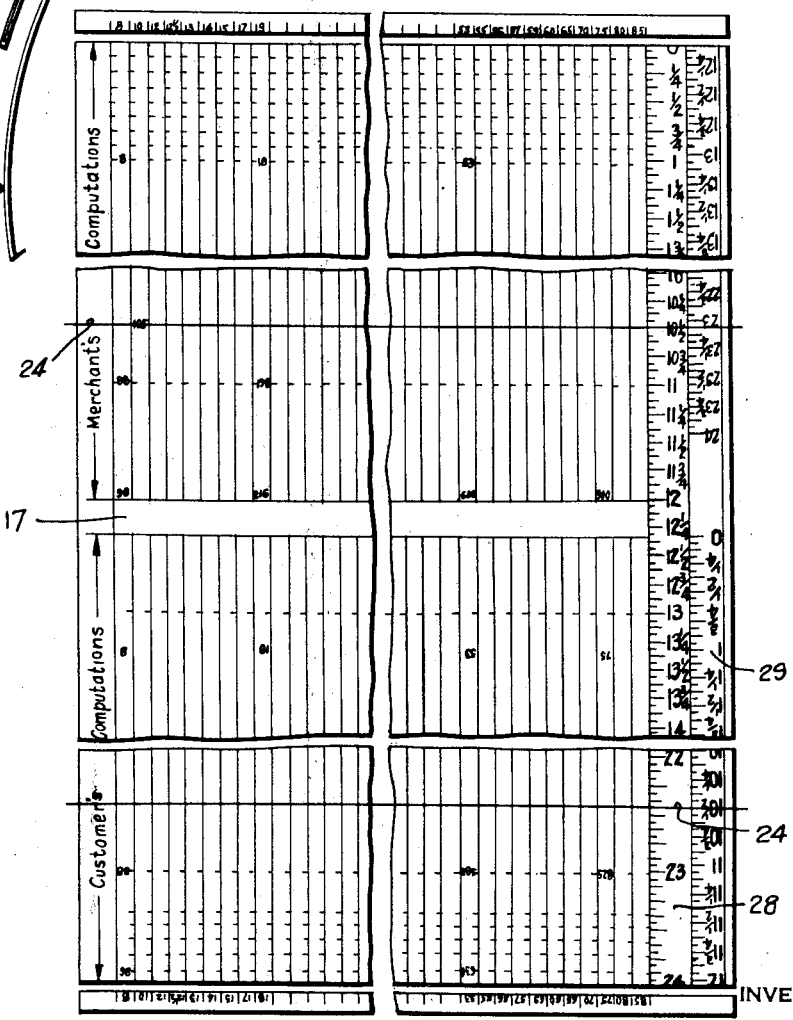
INVENTOR
James S. Ogsbury
BY
ATTORNEY Jan. 8, 1935.  J. S. OGSBURY  1,987,308
SCALE
Filed May 6, 1933   5 Sheets-Sheet 5

INVENTOR
James S. Ogsbury
BY
W. M. Wilson
ATTORNEY

Patented Jan. 8, 1935

1,987,308

UNITED STATES PATENT OFFICE 1,987,308

SCALE

James S. Ogsbury, Dayton, Ohio, assignor, by mesne assignments, to International Business Machines Corporation, New York, N. Y., a corporation of New York Application May 6, 1933, Serial No. 669,631

5 Claims. (Cl. 265—29)

This case relates to weighing and computing scales of the drum type, for use on counters of retail vending stores and is directed to an improvement on the construction shown in application Serial No. 617,091, filed August 14, 1932.

In drum scales, the weight of an article placed on the platform rotates a cylinder or drum chart having a plurality of parallel circumferential columns of price indications, each column based on a different price per pound or rate. To provide the customer as well as the merchant with an indication of the price of the weighed article, the price columns adapted to be viewed in upright position by the merchant may extend only half-way around the chart and the other half of the chart may have marked thereon duplicate price columns with their figures adapted to be viewed in upright position from the customer's side of the scale opposite the merchant.

While each set of price columns extends only half-way around the chart, it is desired that the full circumference and weight range of the chart be utilized. Thus, the chart may be used for weighing, for example, up to thirty pounds while computing only to fifteen pounds.

To prevent the merchant and customer from reading each other's sets of price indications, a chart masking and concealing shutter mechanism disclosed and claimed in aforementioned application, has been manually operated by the merchant after the chart has moved through half its weight range or through its total price range.

The object of the present invention is to take control of the shutter mechanism away from the merchant and to make it operate automatically when the chart has passed its price range and is beginning its second half of the weight range.

An object of the present invention is also to provide such automatic control means of the shutter as will not interfere with the proper and accurate operation of the scale.

Further and other objects and advantages will be hereinafter set forth in the accompanying specification and claims, and shown in the drawings, which by way of illustration show what is now considered to be the preferred embodiment of the invention.

Figure 9:
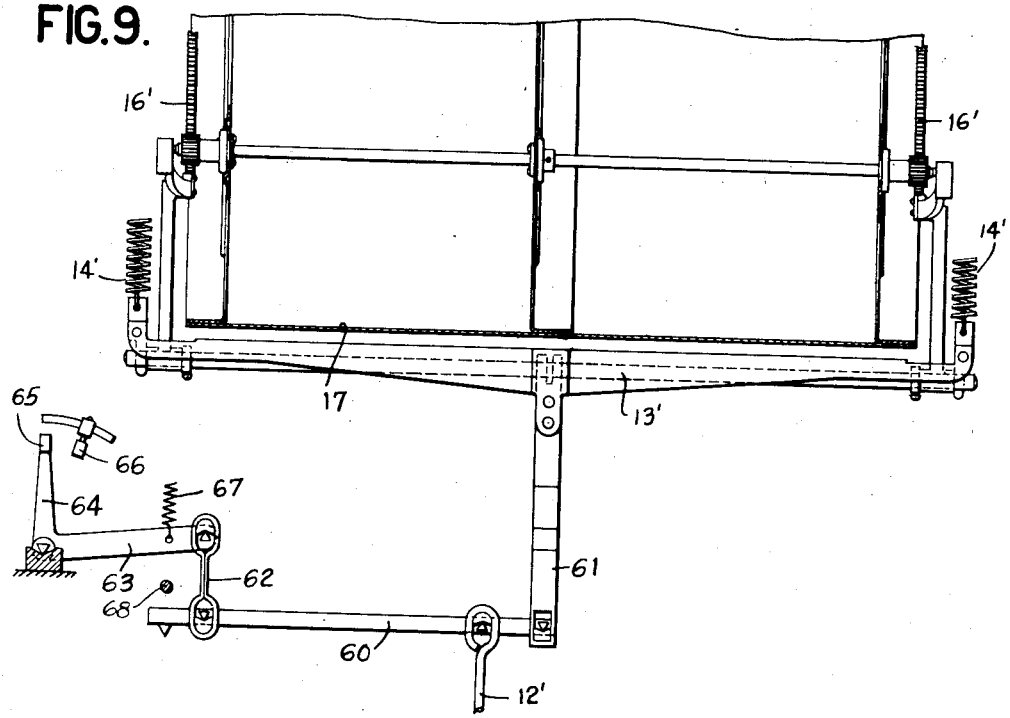
Figure 8:
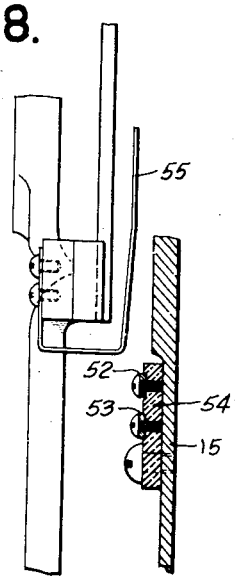

In the drawings:

Fig. 1 is a side view of the scale with the upper part in section,

Fig. 2 is an elevation of the upper part of the scale from the merchant's side with some of the parts broken away and in section to show the interior, Fig. 3 is a top view of the scale with the outer cover in section, Fig. 4 is an enlarged, detail view of the shutter actuating connections, Fig. 5 is a fragmentary view of the customer's side of the scale chart and casing with the shutter in open or inactive position, Fig. 6 is a view similar to Fig. 5 with the shutter in closing or chart masking position, Fig. 7 is a development of the chart, Fig. 8 is a detail of the circuit closer of the shutter operating mechanism, and, Fig. 9 is a skeleton view of the scale combined with a different form of circuit closer.

The scale comprises a goods platform 10 supported by base lever 11 which through vertical connection 12 operates horizontal draft device 13. Connected to opposite ends of device 13 are springs 14 suspended from end frames 15 and racks 16 for rotating chart 17. The chart is encased by upper and lower casing halves 18 and 19 capped by illuminating head 20 which carries lamps 21 for illuminating the chart when an article is placed on the platform. Lower casing half 19 has integral pressed-out portions 22 at opposite sides for mounting cylinder lenses 23 which magnify the chart indications. The indications are indexed by zero lines 24 and the chart columns are correlated with rates 25 on price faces 26 secured at opposite ends to end frames 15 (see Fig. 2). For further understanding of the weighing mechanism of above construction, reference may be had to Patent No. 1,690,258.

Referring to the development of the chart, Fig. 7, it is seen that the scale has a total weight capacity range of twenty-four pounds, and a total price range of only twelve pounds. One-half of chart 17 is covered with a set of merchant's computation values and the opposite circumferential half is covered with a duplicate set of customer's values. Identical values are about 180° apart and the index lines 24 of the merchant and customer are similarly displaced. To provide weight readings throughout the full range of the chart, the latter has a single customer's column 28 of weight indications and a single weight column 29 for the merchant.

After the chart passes its twelve pound point, the merchant's set of value indications would appear in inverted position to the customer and the customer's set of value indications would appear to the merchant in inverted position. To prevent confusion and error, a shutter mechanism automatically comes into action when the scale goes beyond the twelve pound mark to conceal both sets of value indications at opposite sides of the scale.

The weight indications, however, remain exposed and the scale may then be used to weigh articles up to twenty-four pounds although their price values will not be indicated.

The shutter mechanism comprises curved sheet metal plates 30 and 31 respectively on the merchant's and customer's sides of the scale and secured at their upper ends to elongated bars 32 projecting lengthwise of the chart from curved, circumferentially extending movable supporting brackets 33, one at each end of the scale. The brackets 33 have circumferential slots 34 receiving guiding pins 35 and 36, the latter being centrally located between pins 35. The pins 35 and 36 are secured at their lower ends to a centrally disposed curved bracket 37 fastened to the upper drum casing half 18 which is fixed by screws 38 to the end frames 15. Movable brackets 33 are spaced apart from bracket 37 by anti-friction elements 39 retained in bracket 37 and by washers 40 on pins 35 and 36. To frictionally hold the brackets 33 in position, the pins 35 have spring pressed washers 40' bearing on the top of the brackets 33 and pin 36 has a spring 41 pressing on the pulley 42 which rests on the top of brackets 33.

Secured to the right hand bracket 33 at the customer's side, as viewed in Figs. 2 and 3, is one end of a cable 43 which bends around the lower groove of the right hand pulley 42 and from there departs at right angles, lengthwise of the chart, passing through the solenoid coil 44 and its armature 45 to which it is secured by screw 46 and continuing into the upper groove of the left hand pulley 42 which directs the cable towards the end of the left hand bracket nearest the customer to which it is secured. To the end of the left hand bracket nearest the merchant is secured a cable 47 which bends around the lower groove in left hand pulley 42, extends lengthwise of the chart into the upper groove in right hand pulley 42 and then downwardly to be secured to the end of the right hand bracket 33 nearest the merchant.

Solenoid 44 is carried by a U-shaped bracket 48 mounted by angle bracket 49 to the top of the upper casing half 18. The armature 45 is normally urged outwardly and towards the left, as viewed in Figs. 2 and 3 by a coil spring 50. When solenoid coil 44 is energized it attracts its armature to the right, against resistance of spring 50, pulling cable 43 to the right which thereby actuates the left hand bracket 33 circumferentially towards the merchant's side of the scale and positions the merchant's shutter 30 secured to the latter bracket in position for concealing the chart at the merchant's side, as shown by dotted lines in Fig. 4. This movement of the left hand bracket 33 pulls downwardly on cable 47 causing the intermediate part thereof to move to the left and thereby pulling up on the right hand bracket 33 to move the shutter 31 connected to the latter bracket downwardly towards the customer's side of the scale into chart concealing position indicated in dotted lines in Fig. 4. To return the shutters to chart exposing positions, indicated in full lines in Fig. 4, the solenoid coil 44 is deenergized and spring 50 expands and reverses the movements, just described, of the shutter parts.

The solenoid is not energized during the movement of the chart through its price range but is energized as soon as the chart passes beyond its price range into the twelve to twenty-four pound weight field. To control the energization of the solenoid, the circuit closer shown in Figs. 1 and 8 may be used. This circuit closer comprises a pair of terminals 52 and 53 secured to an insulator block 54 in turn secured to an end casting 15. Rigidly movable with a rack 16 and insulated therefrom is a very flexible, light flat spring 55 which does not contact both terminals 52 and 53 until the scale passes its twelve pound point. As soon as this point is passed, terminals 52 and 53 are serially connected by spring 55 and remain connected during the second half of the weight range of the scale.

When terminals 52 and 53 are thus connected the circuit through solenoid 44 is closed and the shutters 30 and 31 accordingly moved into chart concealing positions.

Briefly summarizing the operation of the above parts, a load placed on platform 10 rocks base lever 11 to move rod 12 and draft device 13 downwardly against resistance of springs 14 connected to device 13. Racks 16 also connected to device 13 rotate chart 17 to disclose through the customer's and merchant's sight windows all the duplicate price and weight indications. If the article weighs more than twelve pounds, metal spring 55 bridges terminals 52 and 53 closing the circuit through solenoid 44 which operates cables 43 and 47 to move the shutters 30 and 31 from full to dotted line positions (Fig. 4) in which they mask the price part of the chart at both the customer's and merchant's sides, leaving the weight columns 28 and 29 exposed. The shutter remains closed for all weights from twelve to twenty-four pounds. When the load is relieved from the platform, the spring 55 disengages terminals 52 and 53 and opens the solenoid circuit permitting spring 50 to restore the shutter parts to full line and open position.

Fig. 9 shows an embodiment of the scale combined with a different form of circuit closer. In this embodiment, draft rod 12' connected at its lower end to the base lever and platform system is hooked at its upper end to a factor lever 60 which at the right is connected by a steelyard 61 to the horizontal draft device 13' which operates the springs 14' and the racks 16' rotating the drum chart, just as in the first described embodiment. The left hand end of the factor lever 60 is connected by a steelyard 62 to a short lever 63 which has an arm 64 provided with a contact 65 for engaging a stationary contact 66 to close the solenoid circuit. The lever 63 is connected to a resistant spring 67 which holds contacts 65 and 66 disengaged until the scale passes beyond its twelve pound or price range.

When the contacts engage, they close the circuit through the solenoid, moving the shutters to chart concealing positions. The left end of lever 63 comes to rest against fixed block 68 to prevent separation of contacts 65 and 66 during the second half of the weight range of the scale. The action of the contact closer consisting of steelyard 62, lever 63, contacts 65, 66 and spring 67 does not have the slightest reactive effect on the main scale which operates the drum chart and does not affect in any degree the accuracy of the weighing operations nor of the price and weight indications. This may be understood from the fact that the proportion of the total pull from draft rod 12 which is transmitted through lever 60 to the steelyard 61 of the main scale remains the same regardless of the operation or position of lever 60 or of the parts connected to the left hand end thereof, being dependent solely on the length of lever 60 between its points of connection to rod 12' and steelyard 61.

While there has been shown and described and pointed out the fundamental novel features of the invention as applied to the several modifications, it will be understood that various omissions and substitutions and changes in the form and details of the devices illustrated and in their operation may be made by those skilled in the art without departing from the spirit of the invention. I, therefore, intend to be limited only as indicated by the scope of the following claims.

What is claimed is:

1. In a scale, a load support, counterbalancing and indicating means operated by the support upon imposition of a load thereon, the indicating means comprising a rotatable drum chart with a column of weight indications extending throughout substantially the full range of movement of the chart and columns of computations based on different unit factors extending around the chart for less than its full range of movement, an enclosure for the chart including a sight window through which the weight indications and computations are simultaneously exposed to view throughout the computation range of the chart, obscuring means for rendering the view of the computations through the sight window ineffective after the chart passes the computation range, while the weight indications remain visible through said window, a control for the obscuring means, and connections between the load support and the control for automatically operating the latter upon the chart passing beyond the computation range.

2. In a scale, a load support, counterbalancing and indicating means operated by the support upon imposition of a load thereon, the indicating means comprising a rotatable drum chart with duplicate columns of weight indications arranged to be read from opposite sides of the scale throughout the full weight range of the scale, the chart having duplicate sets of columns of computations, each set of computations extending about half-way around the chart, the sets being on opposite halves of the chart and arranged to be read from opposite sides of the scale, a casing for the chart with sight windows at opposite sides through each of which one of the weight columns and one of the sets of indications may be viewed, and obscuring means automatically operated under control of the load support for obscuring the reading of both the sets of computations at the opposite sight windows when the chart passes beyond the computation range.

3. In a scale, a load support, counterbalancing and indicating means operated by the load support upon imposition of a load thereon, the indicating means comprising a drum chart opposite halves of which bear duplicate computations arranged to be viewed from opposite sides of the scale, an enclosure for the chart having sight windows at opposite sides of the scale to which the duplicate computations are simultaneously presented for view therethrough, shutters at opposite sides of the scale, and means controlled by the load support for automatically moving the shutters into positions at the sight windows for obscuring the chart computations after the chart has made substantially one-half a revolution and has passed beyond the computation range.

4. In a scale, a load support, counterbalancing and indicating means operated by the support upon imposition of a load thereon, the indicating means comprising a rotatable drum chart having duplicate weight columns extending the full range of the chart and duplicate sets of computation columns, each set extending through about half the full range of the chart, a casing having sight windows at opposite sides through each of which one of the weight indicating columns and one of the sets of computations may be viewed in upright position, shutters, one at each side of the chart, supporting means for the shutters stationary relative to the casing, electrical means for operating the shutters relative to the supporting means into positions at their corresponding sight windows for obscuring only the computations and leaving the weight columns exposed and a control for said electrical means operated by the load support when the scale passes beyond the computation range of the chart to cause the shutters to move into said obscuring positions to thereby prevent inverted computations appearing at the sight windows.

5. In a scale, a load support, load counterbalancing and indicating means, means coacting with the indicating means for determining its visibility, an auxiliary load resistant mechanism for controlling the visibility determining means, a factor lever having a connection to said first mentioned means, an operating connection from the load support to the factor lever, and a connection from the factor lever to the auxiliary mechanism for actuating the latter and the visibility determining means independently of and without reactive interference with operation of the first named load counterbalancing and indicating means.

JAMES S. OGSBURY.